(12) United States Patent
Buchin et al.

(10) Patent No.: US 8,039,069 B2
(45) Date of Patent: Oct. 18, 2011

(54) COMPOSITE STRUCTURAL PART FORMED OF MULTIPLE LAYER FIBROUS PREFORMS INTER-FITTED WITH ONE ANOTHER AND REINFORCED WITH A POLYMER MATRIX COATING

(75) Inventors: Jean-Michel Buchin, Lons le Saunier (FR); Michel Genot, Relans (FR)

(73) Assignee: SKF Aerospace France, Saint Vallier sur Rhone (FR)

( * ) Notice: Subject to any disclaimer, the term of this patent is extended or adjusted under 35 U.S.C. 154(b) by 996 days.

(21) Appl. No.: 11/808,924

(22) Filed: Jun. 13, 2007

(65) Prior Publication Data

US 2007/0293110 A1 Dec. 20, 2007

(30) Foreign Application Priority Data

Jun. 13, 2006 (FR) ...................................... 06 05245

(51) Int. Cl.
*F16B 2/00* (2006.01)

(52) U.S. Cl. ....... 428/33; 428/34.6; 428/34.7; 428/36.1; 428/36.91; 428/57

(58) Field of Classification Search .................. None
See application file for complete search history.

(56) References Cited

U.S. PATENT DOCUMENTS

| 5,635,272 A | 6/1997 | Bogetti et al. |
| 5,776,582 A | 7/1998 | Needham |

FOREIGN PATENT DOCUMENTS

| DE | 43 03 054 | 8/1993 |
| FR | 2 572 788 | 5/1986 |
| WO | 2004/024533 | 3/2004 |

*Primary Examiner* — Angela Ortiz
*Assistant Examiner* — Camie Thompson
(74) *Attorney, Agent, or Firm* — Dowell & Dowell, PC

(57) ABSTRACT

A composite part including a fibrous assembly including at least two preforms each of which includes layers of fibrous cloths. Each preform includes at least one opening or protruding structure which is substantially complementary to the structure of the other preform. The first and second preforms are engagement with one another and are firmly connected by a polymer matrix being injected around the preforms.

9 Claims, 3 Drawing Sheets

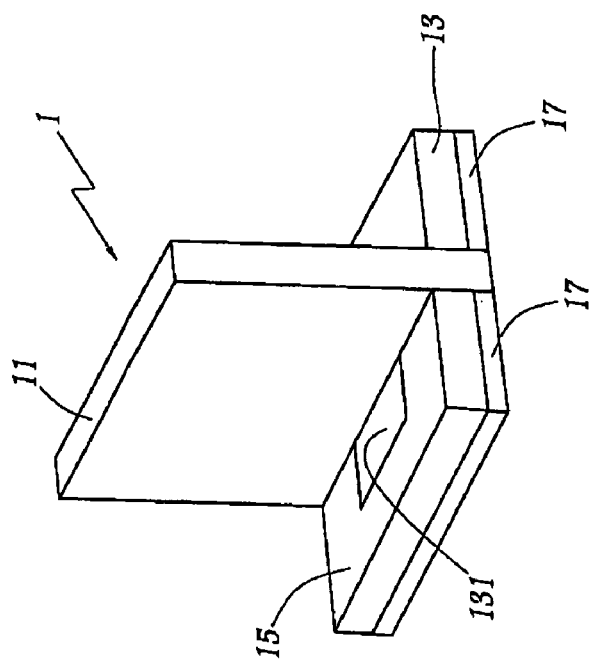
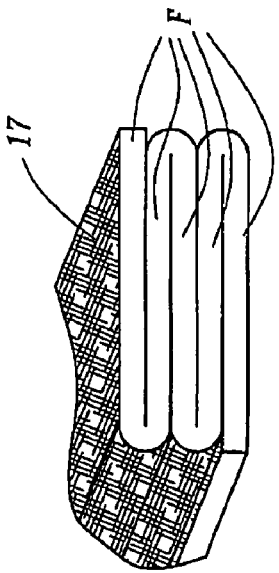
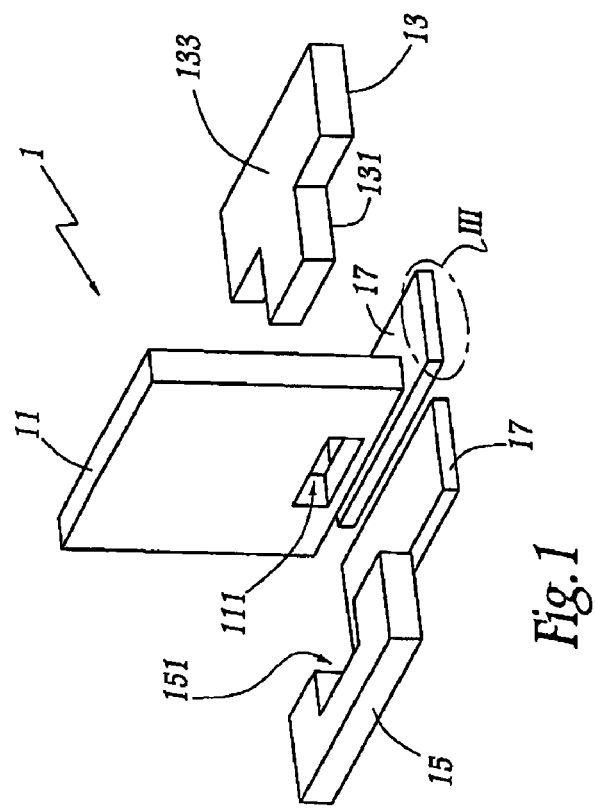

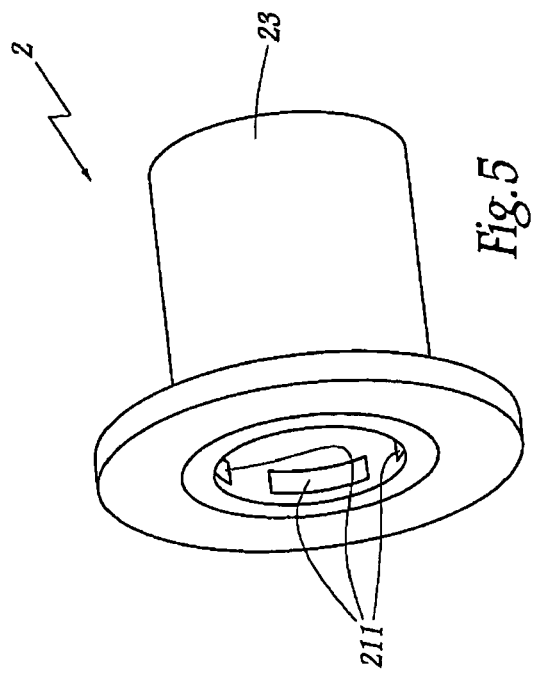
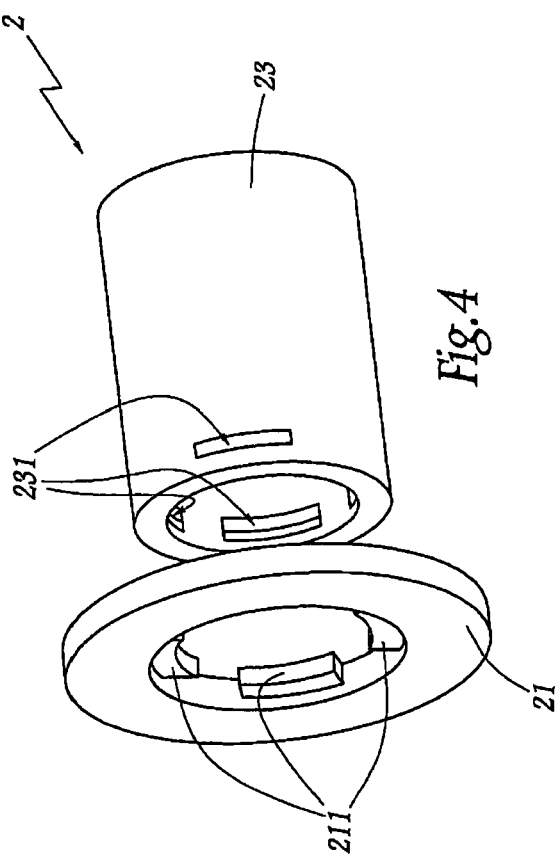

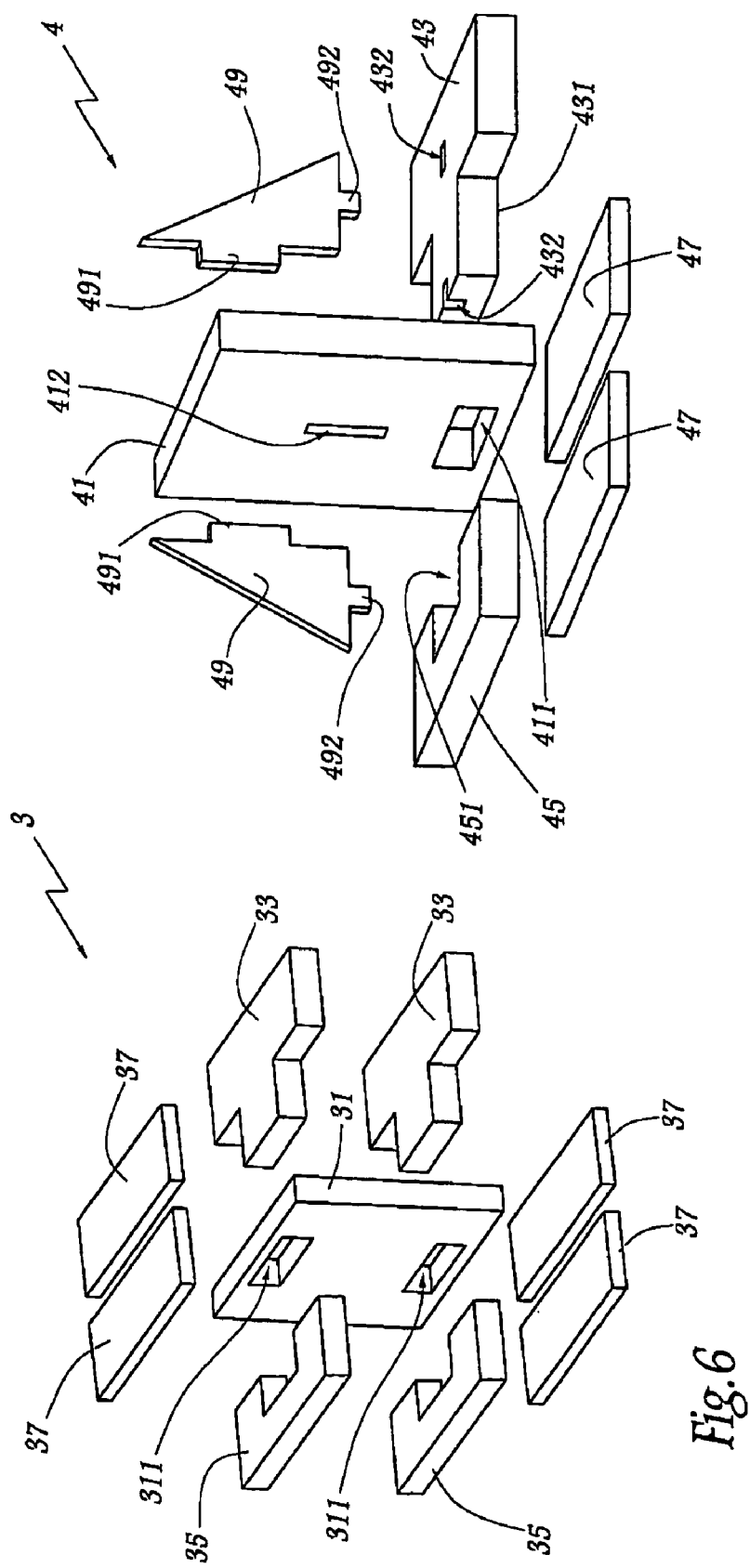

COMPOSITE STRUCTURAL PART FORMED OF MULTIPLE LAYER FIBROUS PREFORMS INTER-FITTED WITH ONE ANOTHER AND REINFORCED WITH A POLYMER MATRIX COATING

BACKGROUND OF THE INVENTION

1. Field of the Invention

The present invention relates to a fibrous assembly for a composite part, to a composite part and to a method for manufacturing such a composite part.

2. Brief Description of the Related Art

In the field of aeronautics it is known to use parts made of composite material for connecting structural parts and transmitting movements or forces. In particular, it is known to use T-section composite parts for making the connections between a fuselage and structural or control connecting rods of an aircraft. Such a T-section composite part is conventionally manufactured by stacking individual fibrous cloths in a T-section mould, then by injection and polymerisation of a polymer resin in the mould. During their placement in the mould, the individual cloths are folded one by one into an L-shape, so as to extend both into the vertical bar and into one half of the horizontal bar of the T-shape. Such an operation is long and arduous. In addition, owing to the folding of the individual cloths into an L-shape on either side of a central axis of the T, the mechanical strength of the T-shaped composite part is provided solely by the resin at the junction between the vertical and horizontal bars of the T. The result of this is limited mechanical strength of the composite part in this area where the stresses are greatest.

SUMMARY OF THE INVENTION

It is these drawbacks which the invention is intended more particularly to remedy by proposing a fibrous assembly for a composite part, i.e. a fibrous assembly round and into which a polymer matrix is intended to be injected in order to make a composite part, making it possible to obtain a composite part having improved mechanical characteristics and the manufacturing method of which is simple and rapid.

To this end, the subject of the invention is a fibrous assembly for a composite part, comprising at least two preforms, each including stacked fibrous cloths, wherein each preform includes at least one structure, the structure of a first preform being substantially complementary to the structure of the second preform and the first and second preforms being adapted to be fitted one into the other by engagement of their respective structures.

According to other advantageous characteristics of the invention:
  the structures of the first and second preforms have mating surfaces intended to co-operate when the structures are in engagement, and adapted to keep the preforms fitted one into the other;
  the stacking direction of the cloths of the first preform is transverse to the stacking direction of the cloths of the second preform fitted into the first preform;
  the stacking direction of the cloths of the first preform is substantially perpendicular to the stacking direction of the cloths of the second preform fitted into the first preform;
  the first and second preforms are plates of stacked fibrous cloths, the plane of the cloths of the first preform being transverse to the plane of the cloths of the second preform fitted into the first preform, said planes being concurrent in the zone in which the preforms are fitted into one another;
  the first preform is a plate of stacked fibrous cloths, while the second preform is a tube of stacked fibrous cloths, the plane of the cloths of the first preform being transverse to the generatrix lines of the second preform fitted into the first preform, said plane and said generatrix lines being concurrent in the zone in which the preforms are fitted into one another.

The invention also has as its subject a composite part comprising a fibrous assembly such as described above and a polymer matrix.

Advantageously, the fibrous assembly is constituted of carbon, glass or aramide fibres, the polymer matrix being a polymer resin.

Finally, the invention has as its subject a method for manufacturing a composite part comprising the steps of:
  forming at least two preforms by stacking fibrous cloths;
  cutting out at least one structure in each preform, the structure of a first preform being substantially complementary to the structure of the second preform;
  fitting the first and second preforms one into the other by engagement of their respective structures;
  injecting a polymer resin round the first and second preforms fitted into one another.

The cutting-out of the structures of the first and second preforms may be carried out by means of a hollow punch, a water jet, or a laser or manually.

BRIEF DESCRIPTION OF THE DRAWINGS

The characteristics and advantages of the invention will become clear from the following description of some embodiments of a fibrous assembly and of a composite part according to the invention, provided solely by way of example and with reference to the appended drawings, in which:

FIG. 1 is an exploded perspective view of a fibrous assembly according to a first embodiment of the invention;

FIG. 2 is a view analogous to FIG. 1, the preforms of the fibrous assembly being fitted into one another;

FIG. 3 is a view on an enlarged scale of the detail III of FIG. 1;

FIG. 4 is an exploded perspective view of a fibrous assembly according to a second embodiment of the invention;

FIG. 5 is a view analogous to FIG. 4, the preforms of the fibrous assembly being fitted into one another;

FIG. 6 is an exploded perspective view of a fibrous assembly according to a third embodiment of the invention; and FIG. 7 is an exploded perspective view of a fibrous assembly according to a fourth embodiment of the invention.

DESCRIPTION OF THE PREFERRED EMBODIMENTS

The fibrous assembly 1, shown in FIGS. 1 and 2, is intended to constitute a fibrous reinforcement for a composite part. The fibrous assembly 1 has a T-shaped cross-section. The single-piece composite part obtained by the injection of a polymer matrix into the fibrous assembly 1 may for example form a connecting part between a fuselage and a structural or control connecting rod of an aircraft.

The fibrous assembly 1 comprises five preforms intended to be assembled to form the T-section fibrous assembly 1. Each preform of the fibrous assembly is a plate of carbon fibre cloths stacked one upon the other. As illustrated in FIG. 3 for a preform 17, each preform is obtained by folding the same cloth F into consecutive layers.

As a variant, a plurality of strips of individual cloths may be superposed to form each preform of the fibrous assembly 1, and the carbon fibres may also be replaced by glass fibres or aramide fibres.

Each preform of the fibrous assembly 1 is intended to constitute a segment of the T-shape. A preform 11 is provided to form the vertical bar of the T, while preforms 13, 15 and 17 are intended to form together the horizontal bar of the T.

The preforms 11, 13 and 15 include structures that are protruding or recessed, allowing them to be fitted into one another. The preform 11 has a through seat 111, extending between the upper and lower cloth planes of the preform 11. The preform 13 has a generally T-shaped cross-section, the vertical bar of the T being formed by a structure 131 protruding with respect to the horizontal bar 133 of the T. The structure 131 is substantially complementary to the seat 111, such that the preform 13 can be fitted into the preform 11 by engagement of the structure 131 in the seat 111. Moreover, the preform 15 includes a recessed structure 151, which imparts to the preform 15 a cross-section which is generally C-shaped. The recessed structure 151 is substantially complementary to the end portion of the protruding structure 131 of the preform 13, such that the preform 15 may be fitted into the preform 13 by engagement of the structure 131 in the structure 151.

The structures 111, 131 and 151 have mating surfaces intended to be in contact when the preforms 11, 13 and 15 are fitted one into another. The mating surfaces have an extent sufficient to enable the preforms 11, 13 and 15 to be kept fitted one into the other.

The fibrous assembly 1 further comprises two preforms 17 intended to be placed in support against the preforms 13 and 15, on either side of the preform 11, so as to reinforce the horizontal bar of the T formed by the fibrous assembly 1.

A method for the manufacture of the fibrous assembly 1 according to the invention, and of a single-piece composite part comprising the fibrous assembly 1 as a fibrous reinforcement, comprises the steps in which:

Firstly, the preforms 11, 13, 15 and 17 of the fibrous assembly 1 are prepared.

To this end, parallelepipedal plates of carbon fibre cloths are formed by folding consecutive layers of the same carbon fibre cloth F, powdering the stack obtained with an epoxy powder, and heating to a temperature of the order of 100° C. Rigid plates of carbon fibre cloths are thus obtained, the thickness of which may be modulated according to the number of folds of the cloth F which are produced. Advantageously, the plates are shaped to the dimensions of the desired preforms. As a variant, plates of large dimensions may be produced, from which the outlines of each preform are cut out.

The preforms obtained are then provided with their respective structures by cutting out the preforms. The cutting out of the seat 111 of the preform 11, of the protruding structure 131 of the preform 13 and of the recessed structure 151 of the preform 15 is carried out by means of a hollow punch.

The preforms are then suitable for being fitted one into the other, by engagement of their respective structures. The protruding structure 131 of the preform 13 is inserted into the seat 111 of the preform 11, then embedded in the preform 13 by engagement of the protruding structure 131 in the recessed structure 151 of the preform 15. The preforms 17 are also positioned in support against the preforms 13 and 15, on either side of the preform 11, as shown in FIG. 2.

The fibrous assembly 1 with T-shaped cross-section which is obtained is then introduced into a mould of suitable shape, not shown in the drawings, into which a polymer resin in the liquid state, such as an epoxy resin, is injected round the preforms at a temperature between around 80 and 160° C. When the resin is in place inside the mould, it is subjected to a polymerisation step at a temperature between around 120 and 180° C. This step makes it possible to reach a state of vitrification of the resin, which imparts to the composite part thus manufactured a high rigidity and a good surface state.

Such a method for the manufacture of a composite part is rapid and simple to carry out. The placement in the mould of the preforms of dry fibrous cloths is easy and rapid, owing to the shaping and assembly of the cloths prior to their insertion into the mould. The cutting out of the preforms of the fibrous assembly 1 by means of a hollow punch also makes it possible to reduce the manufacturing time.

The single-piece composite part with T-shaped cross-section produced by means of this method has very satisfactory mechanical properties, especially at the junction between the vertical and horizontal bars of the T. In fact, this junction corresponds to the zone in which the preforms fit into one another and in which the planes of the cloths constituting each preform are substantially perpendicular to one another. Thus, the composite part according to the invention is particularly reinforced in this angular junction zone, which is advantageous since the stresses are greatest in this area when the part is subjected to forces.

In the second embodiment shown in FIGS. 4 and 5, a fibrous assembly 2 comprises two preforms 21 and 23. A first preform 21 is annular and is obtained in a similar manner to the previous embodiment, by the formation and cutting out of a plate of stacked carbon fibre cloths. The fibrous cloth plate is produced by stacking consecutive layers of a carbon fibre cloth F, the layers being linked to one another by epoxy powdering and heating to a temperature of the order of 100° C. The fibrous cloth plate thus obtained is then cut out by means of a hollow punch so as to form the preform 21 of annular shape. Protruding structures 211 are also provided by means of a hollow punch on the inner radial surface of the preform 21.

The second preform 23 is tubular in shape and is obtained by winding carbon fibre cloths on a mandrel which is not shown. The wound layers of cloth are linked by epoxy powdering and heating to a temperature of the order of 100° C. Following this heating operation, the tubular preform 23 may be removed from the mandrel by sliding relative thereto. Through seats 231, extending between the innermost layer of cloth and the outermost layer of cloth of the preform 23 are produced by means of a hollow punch, so as to be substantially complementary to the protruding structures 211 of the inner radial surface of the preform 21.

The preforms 21 and 23 are thus adapted to be fitted one into the other, by engagement of the protruding structures 211 of the preform 21 in the seats 231 of the preform 23. The fibrous assembly 2 obtained may then be introduced into a mould of suitable shape, not shown. A polymer resin, such as an epoxy resin, is then injected into the mould, and is subjected to a polymerisation step, as described in the previous embodiment.

The single-piece composite part comprising the fibrous assembly 2 according to this second embodiment has a very satisfactory mechanical strength at the junction between the preforms 21 and 23. In fact, this junction corresponds to the zone in which the preforms fit into one another and in which the plane of the cloths constituting the preform 21 is substantially perpendicular to the generatrix lines of the tubular preform 23, that is to say, to the local plane of the cloths constituting the preform 23. Thus, the composite part obtained with the fibrous assembly 2 is reinforced in said junction zone, which is advantageous since the stresses on the part are greatest in that area.

The third and fourth embodiments of the invention, shown respectively in FIGS. 6 and 7, are other examples of geometries of fibrous assemblies intended to constitute fibrous reinforcements of composite parts. The fibrous assembly 3 according to the third embodiment of the invention has an I-shaped cross-section, obtained by the fitting together of preforms 31, 33, 35 and 37 similar to the preforms 11, 13, 15 and 17 of the first embodiment, the preform 31 being provided with two seats 311 similar to the seat 111 of the first embodiment.

The fibrous assembly 4 of the fourth embodiment of the invention is an improvement to the fibrous assembly 1 with T-shaped cross-section of the first embodiment. The fibrous assembly 4 comprises preforms 41, 43, 45 and 47 similar to the preforms 11, 13, 15 and 17 of the first embodiment, with structures 411, 431 and 451 similar to the structures 111, 131 and 151. It further comprises fins 49 for lateral reinforcement of the junction between the vertical and horizontal bars of the T. The fins 49 are obtained by the formation and cutting-out of plates of carbon fibre cloths, as described previously. Structures 491 and 492 are also cut out by means of a hollow punch on each fin 49, complementary structures 412 and 432 being provided respectively on the preforms 41 and 43 which are similar to the preforms 11 and 13 of the first embodiment. This permits the fitting together of the preforms 41, 43 and 49 in addition to the fitting together of the preforms 41, 43 and 45 which is similar to the first embodiment, through a seat 411 of the preform 41. The fibrous assemblies 3 and 4 are intended to constitute fibrous reinforcements of single-piece composite parts, obtained by the injection and polymerisation of a polymer resin.

As is apparent from the exemplary embodiments described, the invention makes it possible to obtain, by a simple and rapid method, single-piece composite parts of varied and complex geometries having very satisfactory mechanical properties. In the embodiments described, the preforms of a fibrous assembly according to the invention extend in planes transverse to one another, after being fitted together. In the examples described, the planes of the preforms are substantially perpendicular to one another. Thus, the mechanical characteristics of the composite parts according to the invention are particularly good in the zones of angular junction of the parts which correspond to the zones in which the preforms fit together, which is advantageous since these angular junction zones constitute areas of greatest stress.

The invention is not limited to the examples described and illustrated. In particular, the cutting out of the preforms may be carried out by techniques other than by means of a hollow punch, especially by means of a water jet, or a laser or manually.

The invention claimed is:

1. A composite part comprising, a fibrous assembly including at least two preforms, each preform including a plurality of stacked fibrous cloth layers that have been treated and heated to form a rigid structure, wherein a first preform of the at least two preforms includes at least one protruding structure and a second preform of the at least two preforms includes at least one opening structure into which the at least one protruding structure is fitted, the at least one protruding structure of the first preform being substantially complementary in configuration to the at least one opening structure of the second preform, the first and second preforms being fitted one into the other by engagement of their respective structures, and a vitrified polymer resin molded around and covering the fitted first and second preforms thereby forming a rigid composite part.

2. The composite part according to claim 1, wherein the structures of the first and second preforms have mating surfaces which cooperatively engage so as to maintain the preforms fitted one into the other.

3. The composite part according to claim 1, wherein a stacking direction of the cloths of the first preform is transverse to a stacking direction of the cloths of the second preform inter-fitted with the first preform.

4. The composite part according to claim 1, wherein a stacking direction of the cloths of the first preform is substantially perpendicular to a stacking direction of the cloths of the second preform inter-fitted with the first preform.

5. The composite part according to claim 1, wherein the first and second preforms are rigid plates of stacked fibrous cloths, a plane of the rigid plate of the first preform being transverse to a plane of the rigid plate of the second preform fitted into the first preform, the planes intersecting in a zone in which the preforms fit into one another.

6. The composite part according to claim 1, wherein the first preform is a plate of stacked fibrous cloths, while the second preform is a tube of stacked fibrous cloths, the plane of the cloths of the first preform being transverse to the generatrix lines of the second preform fitted into the first preform, the plane and the generatrix lines intersecting in a zone in which the preforms fit into one another.

7. The composite part according to claim wherein the cloths are formed from a group of materials consisting of carbon fibers, glass fibers and aramide fibers.

8. A composite part according to claim 7, wherein the cloth layers are folded one upon another.

9. The composite part according to claim 1, wherein the polymer matrix is a polymer resin.

* * * * *